United States Patent [19]

Ishii et al.

[11] 3,854,456
[45] Dec. 17, 1974

[54] ROTARY INTERNAL COMBUSTION ENGINES

[75] Inventors: Hideto Ishii; Hideki Konishi, Tokyo, Japan

[73] Assignee: Nissan Motor Company, Limited, Kanagawa-ku, Yokohama, Japan

[22] Filed: Aug. 1, 1973

[21] Appl. No.: 384,423

[30] Foreign Application Priority Data
Aug. 2, 1972 Japan................................ 47-91367

[52] U.S. Cl.................... 123/8.45, 60/900, 123/26
[51] Int. Cl............................................ F02b 53/00
[58] Field of Search ....... 123/8.01, 8.05, 8.13, 8.45, 123/26; 60/900, 901

*Primary Examiner*—William L. Freeh
*Assistant Examiner*—Michael Koczo, Jr.

[57] ABSTRACT

A rotary internal combustion engine provided with a secondary air supply port which is valved by a rotor as the rotor planetates within the cavity of a housing.

5 Claims, 3 Drawing Figures

PATENTED DEC 17 1974           3,854,456

ROTARY INTERNAL COMBUSTION ENGINES

The present invention relates to a rotary internal combustion engine having a housing including axially spaced end walls and a multi-lobed peripheral wall therebetween and a multi-apexed rotor disposed within the housing which is rotatably arranged on an eccentric portion of an eccentric shaft transpiercing the axially spaced end walls so as to rotate relative to the housing and to the eccentric shaft, and provided with an intake channel and an exhaust channel in the housing whose control apertures or ports are arranged in the housing and controlled by the rotor. More particularly, the present invention relates to a rotary internal combustion engine provided with exhaust gas purifying means.

From a theoretical standpoint, the rotary internal combustion engine, because of its high surface-to-volume ratio, should be a poor engine from the standpoint of hydrocarbons (HC) and carbon monoxide (CO) and a better engine from the standpoint of nitrogen oxide ($NO_x$). In practical operation of rotary internal combustion engines, it has been found that fresh gases are disposed within the portion of the trailing rotor corner in both the suction chamber and the compression chamber, and that under partial loads, particularly with carburetor operation, an excessively rich mixture is present in the area of the trailing rotor corners. The fresh gases disposed within this portion can be completely combusted only with difficulty because they may not be fully exposed to the ignition flame due mostly to the fact that the ignition flame moves or advances in the same direction as the combustion chamber moves. Hydrocarbons and carbon monoxide are formed or concentrated within the portion of the trailing rotor corner in the exhaust chamber. Thus high concentrations of hydrocarbon and carbon monoxide are present in the exhaust gases. Various inventions have been proposed to reduce the concentrations of hydrocarbons and carbon monoxide in the exhaust gases. It is known in the prior art to provide the rotary internal combustion engines of this type with a secondary air supply channel opening directly into favorably located places in the end walls of the exhaust chamber, such as the secondary air supply channel opening into the exhaust chamber in the end wall in the proximity of the major axis of the housing or in the proximity but prior to the exhaust port. With this arrangement, however, oxidization of the hydrocarbon and carbon monoxide within the portion in the trailing rotor corner in the exhaust chamber will occur with difficulty because a sufficient quantity of secondary air can not be supplied to this portion due to the fact that secondary air delivered from the secondary air supply channel into the exhaust chamber will be directed mostly towards the exhaust port. If the pressure of the secondary air is increased in the secondary air supply channel so as to supply sufficient quantity of secondary air into this portion, dilution of the exhaust gases within the other portion in the exhaust chamber and reduction of exhaust gas temperature will result. Thus oxidization will not take place because of reduction of temperature in the exhaust chamber.

Accordingly, it is an object of the present invention to provide a rotary internal combustion engine of the type described above which eliminates, by extremely simple means, the aforementioned shortcoming of the prior art construction.

It is another object of the present invention to provide a rotary internal combustion engine which assures completely satisfactory oxidization of hydrocarbons and carbon monoxide disposed within the portion in the trailing rotor corner of the exhaust chamber.

A further object of the present invention is to provide a rotary internal combustion engine of the type described above which assures, under all operating conditions, an appropriate supply of secondary air to the exhaust chamber.

These and further objects, features, and advantages of the present invention will become more obvious from the following description when taken in connection with the accompanying drawings, which show, for the purpose of illustration only, one embodiment in accordance with the present invention, and wherein.

Figure 1:
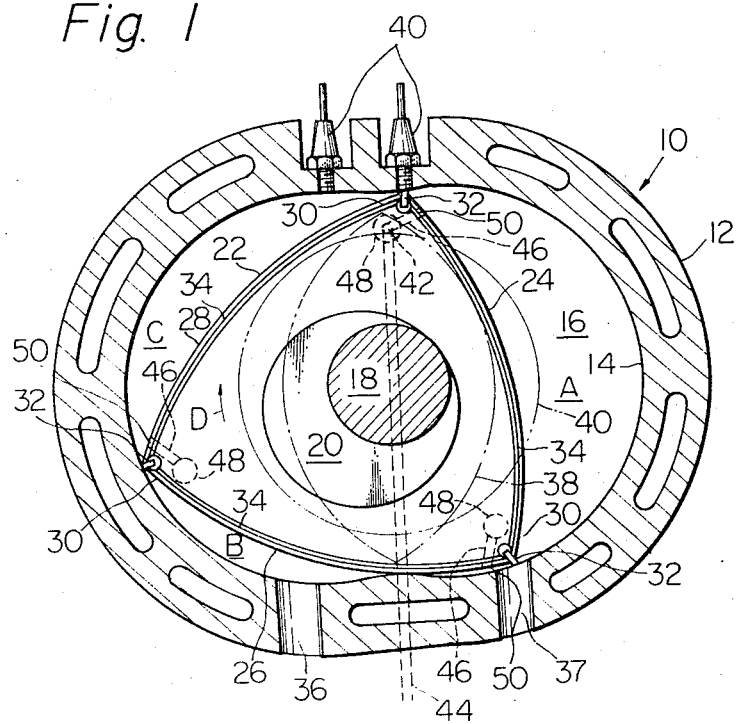
FIG. 1 is a cross-sectional view transverse to the axis of rotary internal combustion engine.

Referring particularly to FIG. 1, there is shown an axial cross-section of a rotary internal combustion engine of the epitrochoidal type, designated generally by a numeral 10, having a housing comprising a peripheral wall 12 with an inner surface 14 of basically an epitrochoidal profile, and a pair of axially-spaced end walls 16, of which only the rearmost is shown. The peripheral wall 12 and end walls 16 define a multilobed cavity through which passes coaxially therewith an eccentric shaft 18 having an eccentric portion 20 disposed within the cavity. A multi-apexed rotor 22, having one more apexes than the number of lobes of the cavity, is rotatably mounted on the eccentric portion 20. As shown here the rotor 22 is generally triangular in outline, although it will be understood that such outline will vary depending on the number of apexes. The rotor 22 has a working face extending between each pair of adjacent apexes, the three working faces shown being designated by the numerals 24, 26 and 28. As the rotor 22 rotates about the eccentric 20, which in turn planetes about the axis of the shaft 18, there are formed variable-volume working chambers A, B and C between the rotor 22 and the peripheral wall 12, the chambers being defined by the housing and the working faces of the rotor.

Each apex portion 30 of the rotor is provided with a radially-movable seal 32 which slides continuously along the inner peripheral surface 14 as the rotor 22 turns. The direction of rotation of the rotor 22 is indicated by arrow D. The end faces of the rotor are provided with axially movable end-face seal or side seal 34 extending between apex portions and generally parallel to the working faces of the rotor 22. The apex seals and the end-face seals in combination prevent leakage of gases from the working chambers as they are formed and move around with the rotor.

The peripheral wall 12 is provided with an intake port 36 and an exhaust port 37 and further provided with relatively small apertures through which ignition sparks will be delivered from spark plugs 40.

During the planetation of the rotor 22 within the housing, there is an area on each end wall which is always covered by the adjacent end face of the rotor 22 and always sealed from the working chamber by the end-face seal 34 provided thereon; this area is shown in FIG. 1 enclosed within the delimiting curve 38 (shown in a phantom line): and there is another area on each end wall within which a ring-type oil seal (not shown) encircling the center opening in the adjacent end wall moves; this area is shown in FIG. 1 enclosed within the delimiting curve 40 (shown in a phantom line). Within the overlapping area of the occluded area of the delimiting curve 38 and the outside area of the delimiting curve 40 one or both end walls is provided with a secondary air supply port 42 adapted for communication with a secondary air supply system (not shown) by conduit 44, the secondary air supply port 42 being located in that portion of the overlapping area which is adjacent to one of the spark plugs.

Communication of the secondary air supply port and the trailing part of the exhaust chamber is established by providing the rotor 22 with at least one passageway 46 leading from an inlet port 48 in at least one end face adjacent to the end wall having the secondary air supply port 42 and terminating at an outlet 50 in the trailing corner portion of the adjacent working face. Preferably a plurality of passageways is provided, as in FIG. 1 wherein one such passageway is shown opening to the working face 24, another passageway opening to the working face 26 and the last passageway opening to the working face 28. The inlet port 48 is located at the edge of the end face of the rotor 22, radially inward of the end seal 34. The inlet port 48 is so disposed in the rotor end face that it does not mate with the secondary air supply port 42 until the leading apex portion of the adjacent working face is about to reach the exhaust port 37. The inlet port 48 may be of any desired contour, but is preferably generally analogous with the contour of the secondary air supply port 42. The size of the inlet port 48 should be so determined relative to that of the secondary air supply port 42 that communication between the secondary air supply port 48 and the passageway 46 will be kept open until an adequate quantity of secondary air has been supplied to the adjacent working chamber. The quantity of secondary air can also be controlled appropriately by altering the pressure of the secondary air in the conduit without excessively enlarging the size of the inlet port.

As shown in FIG. 1, the rotor is in such a position that the exhaust port 37 is open to the chamber which is in the exhaust phase of the cycle, and the inlet port 48 mates with the secondary air supply port 42 and secondary air is injected into the chamber A.

Figure 2:
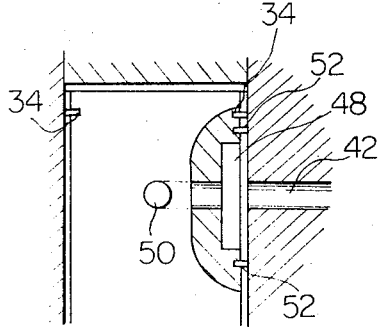
FIG. 2 is a frangmentary side view of the rotary internal combustion engine of FIG. 1.

FIG. 2 shows fragmentary cross-section of the housing and a portion of the rotor, with the secondary air supply port and the rotor inlet port in the position shown in FIG. 1.

Figure 3:
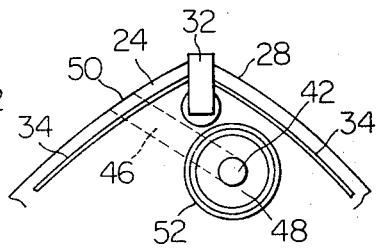
FIG. 3 is a fragmentary plan view of the rotor of FIG. 2.

FIG. 3 shows a seal 52 encircling the inlet port and provided in the end face of the rotor. The seal 52 functions to prevent leakage of secondary air.

It will now be appreciated from the foregoing description of one embodiment of the present invention that secondary air is supplied to the trailing corner portion or part of the exhaust chamber to oxidize the unburned or partly burned gases collected in this part.

It will also be appreciated that the necessary amount of secondary air can be supplied to the trailing corner portion of the exhaust chamber if the size of the inlet port of the passageway and the pressure of the secondary air are appropriate.

One advantage of the present invention is that the secondary air injection timing is controlled by the valving action of the rotor as the rotor planetes within the housing, thus requiring no specially designed controller nor valve.

Another advantage of the present invention is that conventional secondary air feed system can be used without considerable modification for feeding secondary air through the conduit 44.

What is claimed is:

1. A rotary internal combustion engine, comprising in combination a housing having axially spaced end walls and a multilobed peripheral wall therebetween having a basically epitrochoidal inner surface, a multiapexed rotor disposed within said housing whereby on relative rotation of said rotor and said housing variable volume working chambers are formed, said rotor having a working face extending between each pair of adjacent apexes, at least one of said end walls having a secondary air supply port disposed in an area of said end wall that is always covered by said rotor, said rotor having at least one passageway, and inlet port in at least one end face of said rotor that is adjacent to said end wall having said secondary air supply port, each at least one passageway leading from said inlet port and terminating at an outlet port in the trailing corner portion of the adjacent working face opening to the adjacent working chamber, said inlet port so disposed in said end face that it communicates with said secondary air supply port once in each revolution.

2. A rotary internal combustion engine as claimed in claim 1, wherein said inlet port is so disposed in said end face that it communicates with said secondary air supply port when the adjacent working chamber is in the initial stage of exhaust phase of the cycle.

3. A rotary internal combustion engine as claimed in claim 2, having in combination therewith a seal diposed between said end wall having said secondary air supply port and said end face having said inlet port, said seal encircling said inlet port.

4. A rotary internal combustion engine as claimed in claim 2, having in combination therewith a side seal disposed between said end face having said inlet port and said end wall having said secondary air supply port, said side seal being so disposed in said end face of said rotor that it always seal said secondary air supply port from said working chambers.

5. A rotary internal combustion engine as claimed in claim 3, wherein said inlet port is wider than said secondary air supply port.

* * * * *